Figure 1:
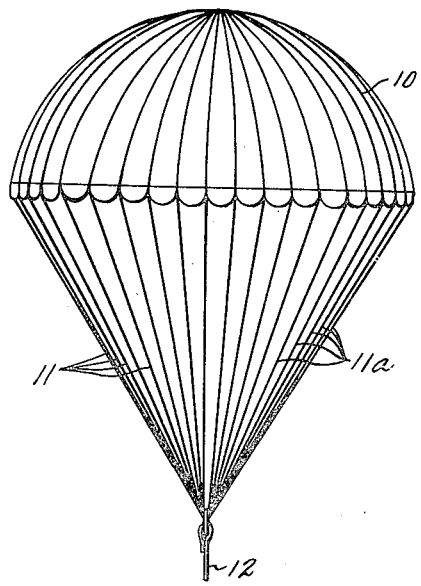

March 14, 1950 F. R. VLASIC 2,500,220
VARIABLE LOAD PARACHUTE
Filed Jan. 20, 1947

INVENTOR.
FRANK R. VLASIC
BY Wade Koonitz
Chester Tietig
ATTORNEYS

Patented Mar. 14, 1950

2,500,220

UNITED STATES PATENT OFFICE 2,500,220

VARIABLE LOAD PARACHUTE

Frank R. Vlasic, New Carlisle, Ohio

Application January 20, 1947, Serial No. 722,992

2 Claims. (Cl. 244—142)

(Granted under the act of March 3, 1883, as amended April 30, 1928; 370 O. G. 757)

The invention described herein may be manufactured and used by or for the Government for governmental purposes without payment to me of any royalty thereon.

This invention relates to an automatic load-varying parachute of the type in which air is spilled from the canopy in proportion to the strain placed upon the shrouds supported by the canopy.

Airplane speeds have become so high at the present writing, that ordinary parachutes can not be used to deliver either cargo or personnel safely from jet propelled aircraft for example.

There have been several attempts made to solve the problem referred to. Patent No. 2,371,898 proposes a parachute having a double canopy, i. e., an inner and an outer one. This construction reduces shock load to some extent but does not virtually eliminate it as my load-varying parachute does. That patent referred to still utilizes a central canopy of solid design which gives rise to heavy shock forces. My load-varying parachute presents a relatively constant rate of load during all speeds up to 300 M. P. H. At speeds in excess of that figure the shock load is equal to the drag of a streaming canopy. This is not true of the variable surface canopy referred to as the subject matter of Patent No. 2,371,898.

One object of the present invention is to provide a parachute by means of which ordinary cargo may be delivered safely to the ground from a jet aircraft or any other aircraft, and which is substantially free from drift-creating features.

Another object is to provide a parachute which will itself be undamaged after it has been used to deliver cargo from a high speed aircraft.

A third object is to provide a parachute of the class described which will deliver personnel safely under the described conditions; however, insufficient trials have been made to determine whether personnel can survive undamaged. It is deemed quite possible. The invention will therefore be described in reference to cargo use, although it is to be understood that the invention may be applied to personnel delivery.

A fourth object is to provide a parachute having resilient shrouds on one side and standard shrouds on the other so that at the instant of opening and during the descent the resilient shrouds will stretch to spill air from under the canopy and minimize shock, but will regain its full supporting power after the shock period has passed.

Figure 2:
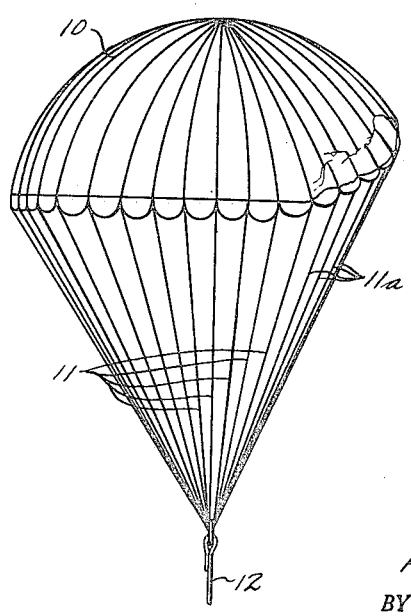

In the drawings:

Fig. 1 is a side elevation of a parachute according to my invention, all shrouds being unstressed; and Fig. 2 is also a side elevation, the shrouds being under stress.

In the drawings, 10 is a conventional round, complete, unbroken parachute canopy, although it may also be of the ribbon type, 11 and 11a are the individual shroud lines, standard shrouds being designated 11 and the especially elastic resilient, strong ones 11a. Shrouds 11a are made of the "nylon" rope, "nylon" being the trade name of a synthetic polyamid elastomer manufactured by E. J. Du Pont Co., Wilmington, Del. Unstressed, both standard shrouds 11 and the especially resilient shrouds 11a are both of the same initial length and substantially the same diameter. 12 is a load of the cargo which it is desired to deliver. 12 may be a person attached to the shrouds 11—11a by means of any appropriate harness (not shown).

The number of "nylon" shroud lines may vary from ¼ to ½ of the total number of shroud lines and the "nylon" ones should be adjacent to each other.

The operation of my parachute is as follows:

The parachute is launched from an aircraft in the usual manner. As soon as the canopy 10 opens under the filling action of the atmosphere, the shrouds 11—11a will be stressed in a substantially equal manner. The strain and resultant temporary elongation undergone by the more elastic shrouds 11a which are made of "nylon" will be greater than that undergone by those 11, which are made of standard material such as linen, cotton or sisal. As a result, air will escape from under the canopy 10 on that side of the parachute upon which there are shrouds 11a which are strained to a longer length than those 11 on the other side of the parachute. Such escape of air will continue until the strain on both sets of shrouds 11 and 11a is equal, when the length of the more elastic shrouds 11a will return to substantially the same length as that of shrouds 11. By the spillage of air from one side of the canopy, severe shock to the parachute and its personnel or cargo has been minimized.

Numerous equivalents of material can be substituted for "nylon." Some of the more obvious equivalents are "Fortisan," "Saran," rubber, metallic springs, and springs of other high strength resilient materials. The canopy 10 need not be round, but may be square, triangular, pyramidal, formed or spherical, with basically the same effect.

The use of permanently longer shroud lines on one side of a canopy than on the other, as disclosed in Patent No. 2,125,198, will not give me the result that I seek and hence is no part of my invention. In that patent a construction is set forth which permits spillage of air from the canopy during the entire descent. This effect I consider to be objectionable since the supporting power of the canopy is diminished during the entire descent. In my invention, the original supporting power is regained after the initial shock has occurred.

I claim as my invention:

1. A parachute comprising a round, complete, unbroken canopy, shroud lines extending from the edge of said canopy, a substantial number of adjacent shroud lines on one side of said canopy being made of flexible resilient, highly elastic, strong material, the remainder of said shroud lines being made of flexible strong material of substantially less elasticity and resilience.

2. A parachute according to claim 1 in which the flexible, resilient, highly elastic, strong adjacent shroud lines range in proportion between ¼ to ½ of the total number of shroud lines.

FRANK R. VLASIC.

REFERENCES CITED

The following references are of record in the file of this patent:

UNITED STATES PATENTS

| Number | Name | Date |
| --- | --- | --- |
| 2,125,198 | Pool | July 26, 1938 |
| 2,418,456 | Boland | Apr. 8, 1947 |
| 2,458,264 | Hart | Jan. 4, 1949 |

FOREIGN PATENTS

| Number | Country | Date |
| --- | --- | --- |
| 226,851 | Great Britain | Dec. 30, 1924 |

OTHER REFERENCES

Parts Catalog, 1945, Pioneer Parachute Co. Inc., page 3A.